MATTESON & WILLIAMSON.

Cultivator Tooth.

No. 3,097.

Reissued Aug. 25, 1868.

WITNESSES:

Geo. H. Strong

C. M. McSmith

INVENTOR.

D. B. Matteson

Y. P. Williamson

Dewey & Co

Attorneys.

N. PETERS, Photo-Lithographer, Washington, D. C.

United States Patent Office.

DON CARLOS MATTESON AND TRUMAN PANE WILLIAMSON, OF STOCKTON, CALIFORNIA.

*Letters Patent No.* 63,647, *dated April* 9, 1867; *reissue No.* 3,097, *dated August* 25, 1868.

IMPROVEMENT IN CULTIVATOR-TEETH.

The Schedule referred to in these Letters Patent and making part of the same.

TO ALL WHOM IT MAY CONCERN:

Be it known that we, DON CARLOS MATTESON and TRUMAN PANE WILLIAMSON, of Stockton, San Joaquin county, State of California, have invented certain new and useful Improvements in Cultivator-Teeth; and we do hereby declare the following description and accompanying drawings are sufficient to enable any person skilled in the art or science to which it most nearly appertains to make and use our said invention without further invention or experiment.

The nature of our invention consists in providing a "cultivator-tooth" having a double-pointed bit, so constructed that when the bevel wears from the bottom of the point, it can be turned over, thus sharpening itself, it being attached to a standard, over which and the bit is placed a double mould-board or shovel, the whole held together by bolts passing through them, and the share placed transversely at the bottom. The bit can also be turned around, and the other end used when the first is worn out.

In order to more fully describe our invention, reference is had to the accompanying drawings, and letters marked thereon, in which—

Figure 1 represents a plan or top view.

Figure 2:
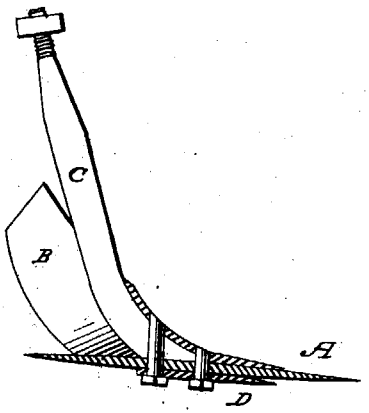

Figure 2, a sectional elevation, taken through the line *x x*, fig. 1.

Figure 3:
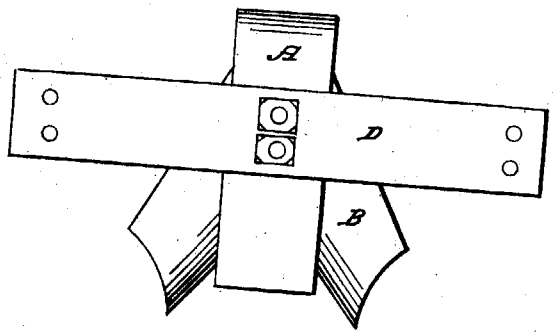
Figure 4:
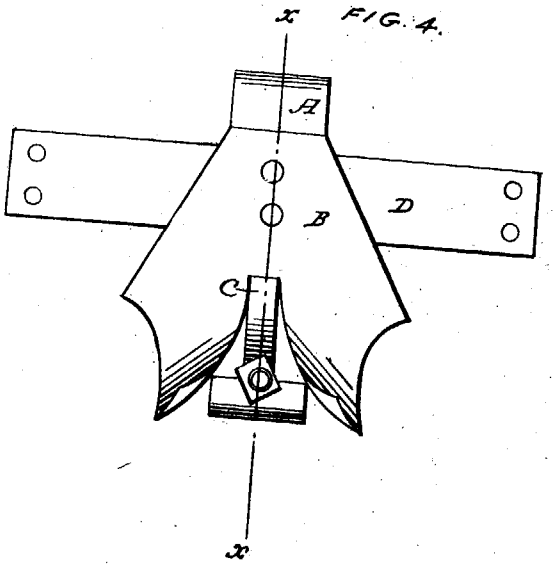

Figure 3, a bottom view.

Similar letters indicate like parts in each of the figures.

A is a flat bit, made with double points, bevelled correspondingly. Over this bit is placed a double mould-board or shovel, B, allowing the bit to project one or two inches, more or less, from it. Upon the bit rests the foot of the standard C, curved and bevelled, so as to fit between the shovel and bit, the upright end or shank of which has a thread and nut, with which to attach it to the cultivator-frame. An oblong share or blade, D, is placed transversely across the bottom of the bit, and the edges of the double mould-board rest upon it. This share can also be changed, so that either edge may be used alternately, or turned over like the bit so as to sharpen itself. In this position, the whole are fastened together by bolts passing through the mould-board, standard, bit, and blade or share. The teeth, when attached to the cultivator-frame, will hang at an angle, so that they may enter the ground to the desired depth, which is regulated by gauge-wheels attached to the frame.

By this arrangement and construction of cultivator-teeth, a mechanism is had that will be found admirably adapted for preparing the soil of the Pacific coast for seeding after plowing, it being the usual custom to fallow by cultivator after the land has remained unseeded for a season, or it may be used to prepare new ground in its hardest state, the mould-board not thus being necessary, and by the use of our cultivator, the necessity of plowing again is obviated, as the arrangement of shares, points, and double mould-board completely destroys the weeds, and cultivates the spaces designed by the width of the frame.

Having thus described our invention, what we claim as new, and desire to secure by Letters Patent, is—

1. The double-pointed adjustable bit A attached to the bevelled foot of the curved standard C, substantially as and for the purpose specified.

2. The oblong blade or share D, in combination with the bit A, substantially as described for the purpose specified.

The above specification of our invention signed by us, this 11th day of February, 1868, respectively.

DON CARLOS MATTESON,
TRUMAN PANE WILLIAMSON.

Witnesses for MATTESON:
WM. F. MCNAMARA,
T. B. MOOSHER.

Witnesses for WILLIAMSON:
R. W. BRUSH,
CARLOS W. MATTESON.